United States Patent [19]

Kawachi et al.

[11] Patent Number: 5,623,350

[45] Date of Patent: Apr. 22, 1997

[54] LIQUID CRYSTAL DISPLAY WITH SUPPLEMENTAL CAPACITORS AND METHOD FOR MANUFACTURING THE SAME

[75] Inventors: Genshiro Kawachi; Etsuko Kimura, both of Hitachi; Kikuo Ono; Yoko Wakui, both of Ibaraki-ken; Akira Sasano, Tokyo, all of Japan

[73] Assignee: Hitachi, Ltd., Tokyo, Japan

[21] Appl. No.: 367,929

[22] Filed: Jan. 3, 1995

Related U.S. Application Data

[63] Continuation of Ser. No. 942,998, Sep. 10, 1992, abandoned.

[30] Foreign Application Priority Data

Sep. 11, 1991 [JP] Japan .................................. 3-231495

[51] Int. Cl.⁶ .............................................. G02F 1/1343
[52] U.S. Cl. .............................................. 349/38; 349/139
[58] Field of Search ........................................ 359/59, 87

[56] References Cited

U.S. PATENT DOCUMENTS

| | | | |
|---|---|---|---|
| 4,781,438 | 11/1988 | Noguchi | 359/59 |
| 5,017,984 | 5/1991 | Tanaka et al. | 257/61 |
| 5,028,122 | 7/1991 | Hamada et al. | 359/59 |
| 5,032,531 | 7/1991 | Tsutsui et al. | 359/59 |
| 5,054,887 | 10/1991 | Kato et al. | 359/59 |
| 5,087,113 | 2/1992 | Sakono et al. | 359/59 |
| 5,151,807 | 9/1992 | Katayama et al. | 359/59 |
| 5,155,564 | 10/1992 | Hishida et al. | 257/61 |
| 5,182,661 | 1/1993 | Ikeda et al. | 359/88 |

FOREIGN PATENT DOCUMENTS

| | | | |
|---|---|---|---|
| 59-9962 | 1/1984 | Japan . | |
| 62-269120 | 11/1987 | Japan | 359/59 |
| 1-267618 | 10/1989 | Japan . | |
| 2-149824 | 6/1990 | Japan . | |
| 4-80722 | 3/1992 | Japan | 359/59 |

*Primary Examiner*—William L. Sikes
*Assistant Examiner*—Charles Miller
*Attorney, Agent, or Firm*—Antonelli, Terry, Stout & Kraus, LLP

[57] ABSTRACT

First pixel electrodes and scan signal electrodes are formed in the same plane, and the first pixel electrodes and video signal electrodes are insulated and separated from each other by gate SiN films. Additional capacitors are formed by second pixel electrodes which are connected to the first pixel electrodes through apertures formed in the gate SiN films and which may be cut by a laser beam, and the scan signal electrodes. Thus, a short circuit defect between the electrodes is prevented, a highly reliable additional capacitor is attained, break of wiring is reduced and an aperture factor can be improved by expanding a width of the first pixel electrode. Thus, a multi-tonality and highly fine liquid crystal display device can be manufactured with a high yield.

31 Claims, 13 Drawing Sheets

DIRLB

LIQUID CRYSTAL DISPLAY WITH SUPPLEMENTAL CAPACITORS AND METHOD FOR MANUFACTURING THE SAME

This application is a continuation of U.S. application Ser. No. 07/942,998, filed Sep. 10, 1992, now abandoned.

BACKGROUND OF THE INVENTION

1. Field of the Invention

The present invention relates to a semiconductor device, and more particularly to an active matrix type liquid crystal device using a thin film semiconductor device and a method for manufacturing the same.

2. Description of Related Art

An active matrix type liquid crystal device is in a trend of high fineness and multi-tonality. In order to achieve it, it is essential to form an additional capacitance for each pixel. The additional capacitor is connected to a TFT in parallel with a capacitor of a liquid crystal layer to function to prevent a drop of a voltage to be applied to the liquid crystal layer due to a leakage current of the TFT. A typical construction thereof is disclosed in JP-A-1-267618.

When the prior art additional capacitor is applied to a construction disclosed in JP-A-2-149824 to prevent a short circuit between electrodes, an insulation film of the additional capacitor is a single-layer insulation film and hence it is difficult to maintain a sufficiently high yield in the insulation. Thus, it is difficult to attain a construction which has a highly reliable additional capacitor and reduces the problem of short circuit, merely by a combination of the prior art techniques.

Further, since it is necessary to maintain a certain distance between a pixel electrode and a video signal wiring in order to prevent short circuit between the pixel electrode and the video signal wiring, a space to be occupied by the wiring increases and a sufficient area for the pixel electrodes is not secured. Thus, as an aperture ratio decreases, a surface brightness of the display device is lowered. In order to compensate for it, it is necessary to increase a brightness of a back light, as a result, a cost increases. This problem is more serious as the display device becomes fixed. In order to suppress the reduction of the aperture ratio, it has been suggested to reduce a wiring width of a non-multi-wired portion in order to reduce the area occupied by the wiring, but a problem of breakage of the wiring increases as the wiring width is reduced.

An oxide film of an indium-tin alloy (hereinafter referred to as an ITO film) has been most commonly used as the fixed electrode, and a silicon nitride film (hereinafter referred to as an SiN film) formed by a plasma chemical vapor phase deposition method (hereinafter referred to as a PCVD method) has been most commonly used as first and second insulation films which are gate insulation films. It has been known that when the SiN film is deposited on the ITO film by the PCVD method, the surface of the ITO film is reduced by a reducing atmosphere in the film formation process so that the transparency of the ITO film is lost. In order to prevent it, it has been proposed in JP-A-59-9962 to protect the ITO film by an insulation film such as an $SiO_2$ film prior to the formation of the SiN film. However, the method increases the number of steps of the process and hence the cost.

Further, in the prior art, image sticking is apt to happen because the two insulation layers, the protective insulation layer and the gate insulation layer, are deposited on the pixel electrodes.

SUMMARY OF THE INVENTION

It is an object of the present invention to provide a construction which solves the problems encountered in the prior art.

It is another object of the present invention to provide a construction of a thin film semiconductor device having a highly reliable additional capacitor and a method for manufacturing the same.

It is another object of the present invention to provide a construction of a thin film semiconductor device having redundant wiring for short circuit trouble and a method for manufacturing the same.

It is another object of the present invention to provide a construction of a thin film semiconductor device which does not cause an ITO film to loose its transparency and a method for manufacturing the same.

It is another object of the present invention to provide a construction of a thin film semiconductor device which can prevent the drop of a voltage to be applied to a liquid crystal device and is free from short circuit.

It is another object of the present invention to provide a low cost and high performance liquid crystal device using the thin film semiconductor device having the features described above.

In order to achieve the above objects, there is provided a thin film semiconductor device comprising scan signal electrodes and common electrodes made of first metal electrodes formed on a transparent insulative substrate, video signal electrodes formed on a gate insulator (film) to cross the scan signal electrodes and the common electrodes, thin film semiconductor devices connected to the scan signal electrodes and the video signal electrodes, and pixel electrodes connected to the thin film semiconductor devices. The pixel electrodes comprise first pixel electrodes made of transparent electrodes formed on the same plane as the scan signal electrodes and the common electrodes and second pixel electrodes made of metal electrodes connected to the first pixel electrodes through apertures formed in the gate insulator film. An additional capacitor is formed by the second pixel electrodes and the common electrodes, and an insulation layer held between those electrodes. At least two thin film semiconductor devices are connected to the first pixel electrodes.

The first metal electrodes are alloy films made of Al or Ta or containing those metallic elements as constituents, or a composite film having a plurality of those metal films laminated to form a metallic self-oxidation film.

The area of the apertures formed in the gate insulation film is no less than 50% and no more than 100% of the area of the first pixel electrodes.

In accordance with the above construction, since the pixel electrodes and the video signal electrodes are separated by the gate insulator film and the additional capacitor having the same insulation structure as that of the gate insulation film is formed, the short circuit between the pixel electrodes and the video signal electrodes can be prevented and the highly reliable additional capacitor can be formed. The same function can be attained when the common electrode of the additional capacitor is formed separately from the video signal electrode. In this case, a repairing technique by a laser to be described later may be used by dividing the first pixel electrodes and connecting the division of the first pixel electrodes by the second pixel electrodes in order to impart redundancy to a point defect. Further, since the insulation film of the additional capacitor is formed by the two layers including the metal oxidation film, the breakdown voltage of the additional capacitor rises and the short circuit failure is significantly prevented. Since Al or Ta, or the alloy film of those elements or the composite film of those metal films is used for the scan signal electrodes, a high quality insulation film is attained and a good yield is maintained. By the use of low resistivity Al or alloy film thereof, the propagation delay of the signal is suppressed and a large size display device can be easily manufactured.

Further, since at least 50% of the gate insulation film on the pixel electrodes is removed, the thickness of the insulation film formed on the pixel electrodes does not increase, and the degradation of the image due to the drop of the voltage to be applied to the liquid crystal device and the image sticking are prevented.

DESCRIPTION OF THE PREFERRED EMBODIMENTS

The preferred embodiments of the present invention are now explained with reference to the drawings.

Figure 1:
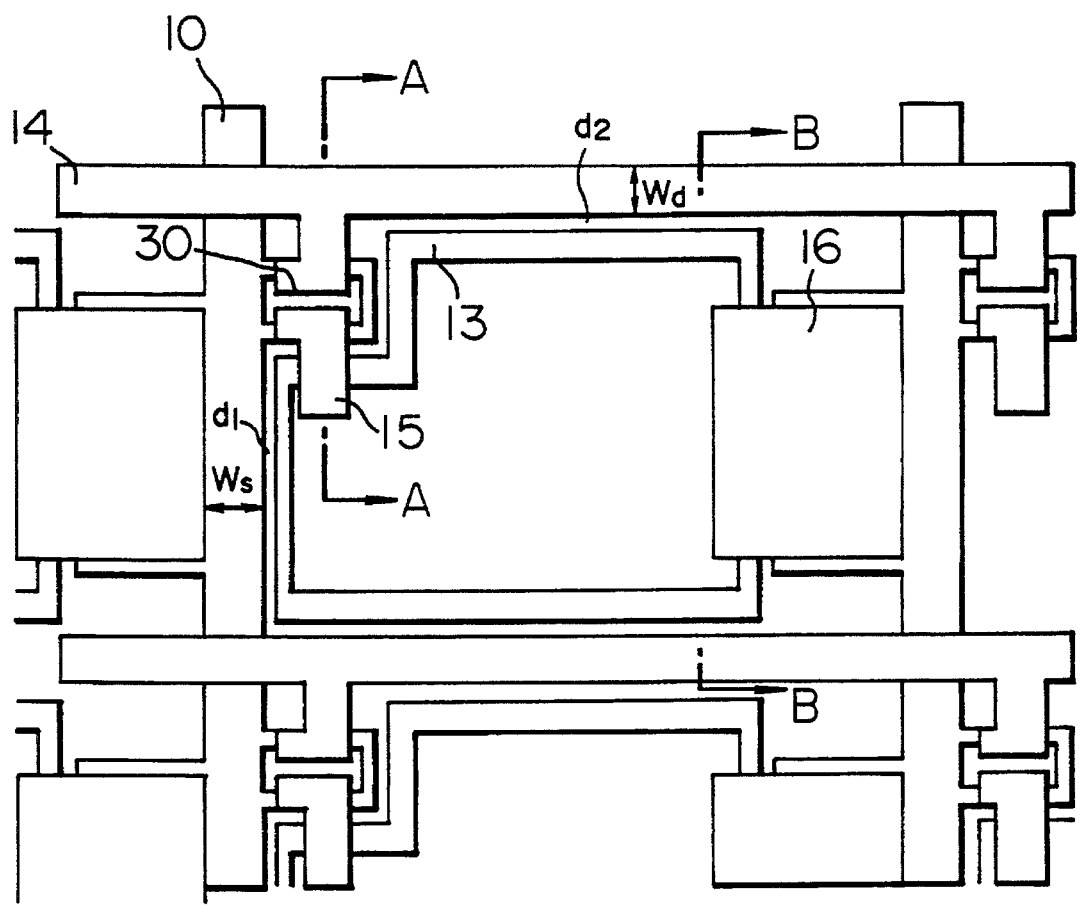
FIG. 1 shows a plan view of a first embodiment of the present invention.
Figure 2:
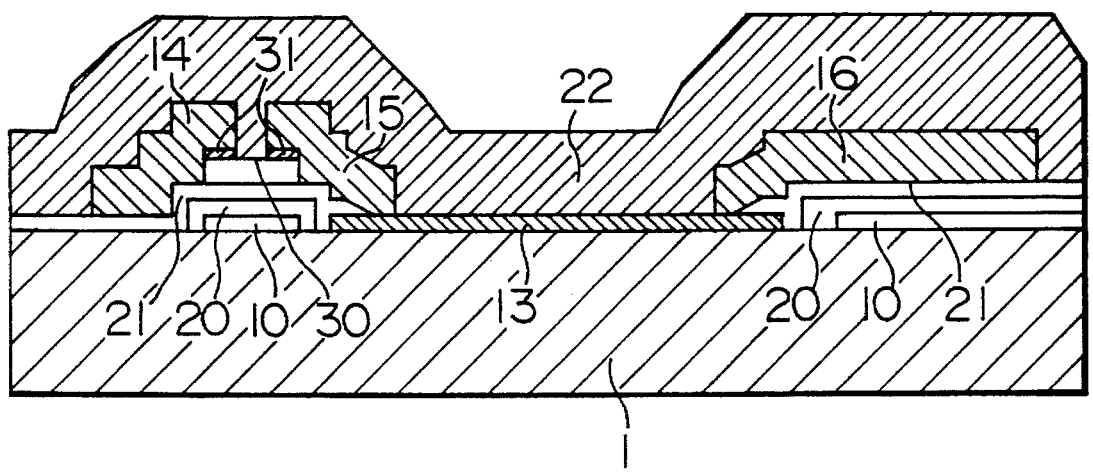
FIG. 2 shows a sectional view of the first embodiment of the present invention.
Figure 3:
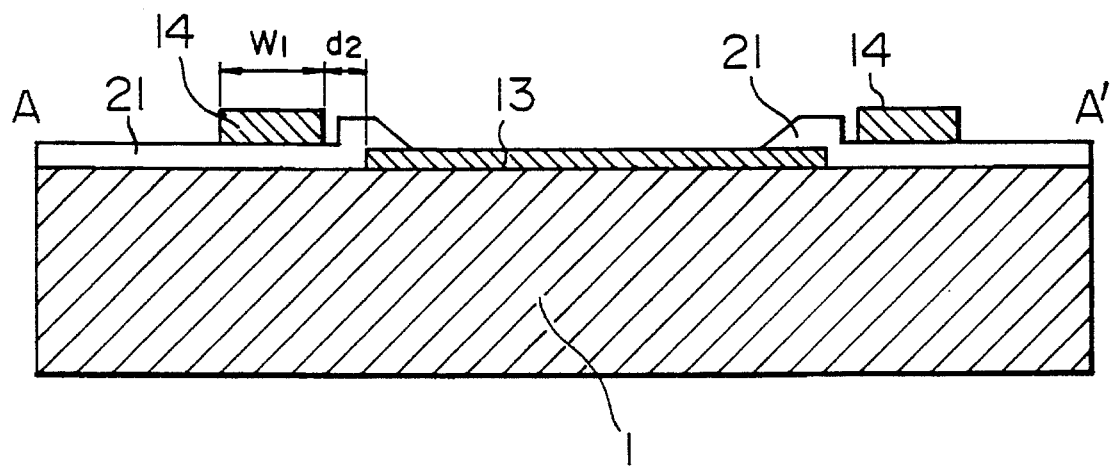
FIG. 3 shows a sectional view of the first embodiment of the present invention.

FIG. 1 shows a plan view of a first embodiment of the present invention, FIG. 2 shows an A—A sectional view of FIG. 1, and FIG. 3 shows a B—B sectional view of FIG. 1. Numeral 1 denotes a glass substrate, numeral 10 denotes a scan signal line, numeral 13 denotes a pixel electrode, numeral 14 denotes a video signal line, numeral 15 denotes a source electrode, numeral 16 denotes a pixel electrode, numeral 20 denotes an aluminum oxidation film, numeral 21 denotes a gate silicon film, numeral 22 denotes a protection film, and numeral 30 denotes an amorphous silicon film.

In the present embodiment, the scan signal lines 10 made of Al are arranged on the glass substrate 1, and the surfaces and the sides of the scan signal lines 10 are covered by $Al_2O_3$ films 20 which are self-oxidation films of Al. The first pixel electrodes 13 made of ITO films are arranged in the same plane as that of the scan signal lines 10. As shown in FIG. 1, a distance $d_1$ between the first pixel electrode 13 and the scan signal line 10 is selected to be smaller than a width Ws of the scan signal width Ws. The SiN film 21 having the number of Si-H couplings per unit volume in the film in a range of $2 \times 10^{21} \sim 1 \times 10^{22}$ cm$^{-3}$ is formed, as the first insulation film, on the scan signal lines and the first pixel electrodes by the plasma CVD method. The gate SiN film 21 on the first pixel electrodes is apertured over an area of at least 50% and no more than 100% of the area of the first pixel electrodes. The ends of the apertures of the SiN film 21 are tapered with a taper angle of 15–30 degrees with respect to the substrate plane. The amorphous Si (a-Si) film 30 and an n-type amorphous Si (n-type a-Si) film 31 doped with an n-type impurity are formed above the scan signal lines with the intervention of the SiN film, and the source electrodes 15 and the video signal lines 14 which also function as drain electrodes, made of Al-Si alloy, are connected to the n-type amorphous Si (a-Si) film 31 to form TFT's. The video signal lines 14 are arranged to cross the scan signal lines 10 and the first ends of the source electrodes are connected to the first pixel electrodes. A distance $d_2$ between the video signal line 14 and the first pixel electrode 13 is selected to be smaller than a width Wd of the video signal line 14. The second pixel electrodes 16 are connected to the first pixel electrodes 13, and portions of the second pixel electrodes 16 extend over the scan signal lines 10 to form additional capacitors $C_{add}$. The overall structure is covered by the protection film 22.

In the present embodiment, the first pixel electrodes 13 are formed in the same plane as that of the scan signal lines 10, and the first pixel electrodes 13 and the video signal lines 14 are separated by the gate SiN film 21. Thus, the short circuit between the first pixel electrode 13 and the video signal line 14 is reduced. As a result, the distance between the first pixel electrode 13 and the video signal line 14 can be reduced to a minimum so that the width of the first pixel electrode 13 can be expanded and the aperture factor can be increased.

Further, since the additional capacitor is formed by the second pixel electrode 16 connected to the first pixel electrode 13, the scan signal line 10, and the $Al_2O_3$ film 20 and the gate SiN film 21 between the electrode 16 and the line 10, the aperture factor is improved and the highly reliable additional capacitor having the two insulation layers is provided so that the short circuit in the additional capacitor is reduced. Further, since the scan signal lines 10 are covered by the $Al_2O_3$ film 21, and the scan signal lines 10 and the first pixel electrodes 13 are insulated and separated from each other, the distance between the scan signal line 10 and the first pixel electrode 13 can be reduced to a limit of alignment precision and hence the width of the first pixel electrode 13 can be expanded and the aperture factor is improved.

In addition, since at least 50% of the SiN film 20 on the first pixel electrodes 13 is removed, the insulation film on the first pixel electrodes 13 is only the protection film 22. As a result, the drop of the voltage applied to the liquid crystal display due to the increase of the thickness of the film because of the double-layer structure of the insulation film and the protection film on the pixel electrodes as it is in the prior art can be prevented. The area of removal of the SiN film 20 should not exceed 100% of the area of the first pixel electrodes 13. The SiN film is apertured above the first pixel electrodes 13 so that the grinding of the underlying glass substrate is prevented when the SiN film is apertured. If the underlying glass substrate is ground, steps of the first pixel electrodes at the pattern ends increase so that breakage of the source electrodes 15 which are subsequently formed is apt to occur. Accordingly, it is necessary that the SiN film is apertured above the first pixel electrodes. The breakage of the source electrodes 15 may be prevented by tapering the ends of the apertures of the SiN film. The breakage of the electrodes can be substantially perfectly prevented when the angle of inclination from a horizontal plane is no larger than 45 degrees.

Figure 4:
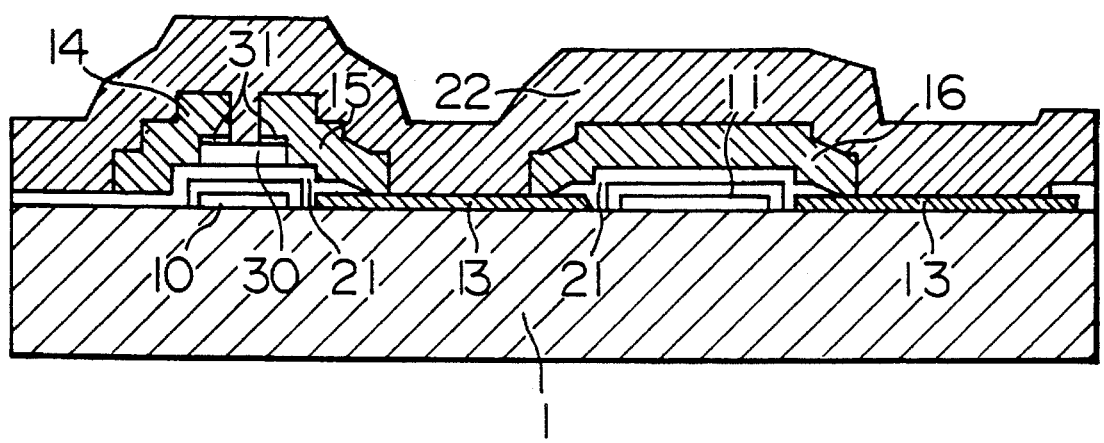
FIG. 4 shows a sectional view of a second embodiment of the present invention.
Figure 5:
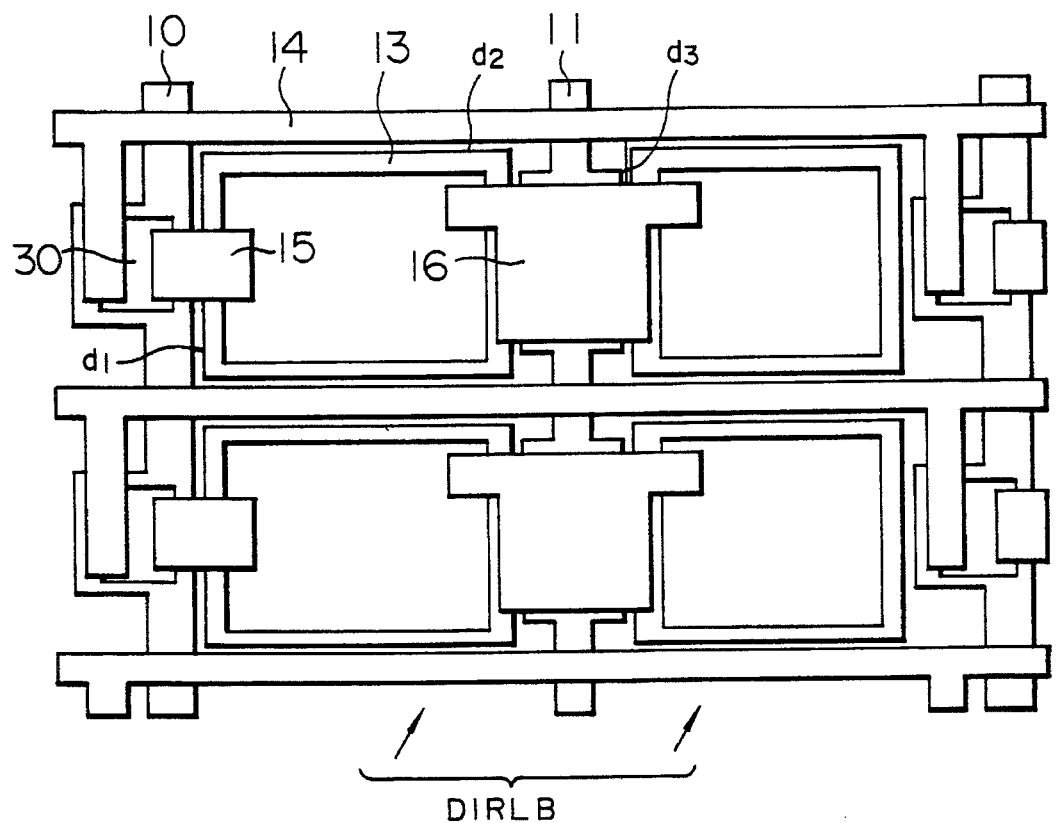
FIG. 5 shows a plan view of the second embodiment of the present invention.

FIGS. 4 and 5 show a sectional view and a plan view of the second embodiment of the present invention. In the present embodiment, a third wiring electrode 11 which is separately formed from the scan signal line 10 is used as a lower electrode of the additional capacitor. In the present embodiment, the first pixel electrode 13 comprises two electrodes which are arranged to sandwich the third wiring electrode 11, and the additional capacitor is formed by the second pixel electrode which connects the above two electrodes, and the third wiring electrode. By this construction, the highly reliable additional capacitor having the two-layer insulation films with the insulation and separation between the video signal electrode and the second pixel electrode is provided, as it is in the first embodiment. Further, the second pixel electrode and the first pixel electrode are connected at a projected area formed in the second pixel electrode. Since the projected area formed in the second pixel electrode can be readily cut by a laser beam, the correction of a defect pixel can be readily done as will be explained later. Further, since a distance $d_3$ between the video signal line 10 and the second pixel electrode is larger than a distance between the video signal line and the first pixel electrode as shown in FIG. 5, the area of the short circuit between the video signal line and the second pixel electrode may be cut by the laser beam as will be explained later so that the defect pixel is corrected. Since the first pixel electrode and the video signal line are insulated and separated from each other by the SiN film, the short circuit therebetween does not occur in principle. Accordingly, the short circuit between the video signal line and the pixel electrode is substantially zero.

The projected area formed in the second pixel electrode is arranged in a downstream one of two adjacent video signal lines as viewed in the direction of rubbing of the liquid crystal orientation film. Arrows (DIRLB) in FIG. 5 shows the direction of rubbing. As a result, the ununiformity in the rubbing downstream of the second pixel electrode does not appear on the pixel electrode so that an image characteristic is not affected.

Figure 6:
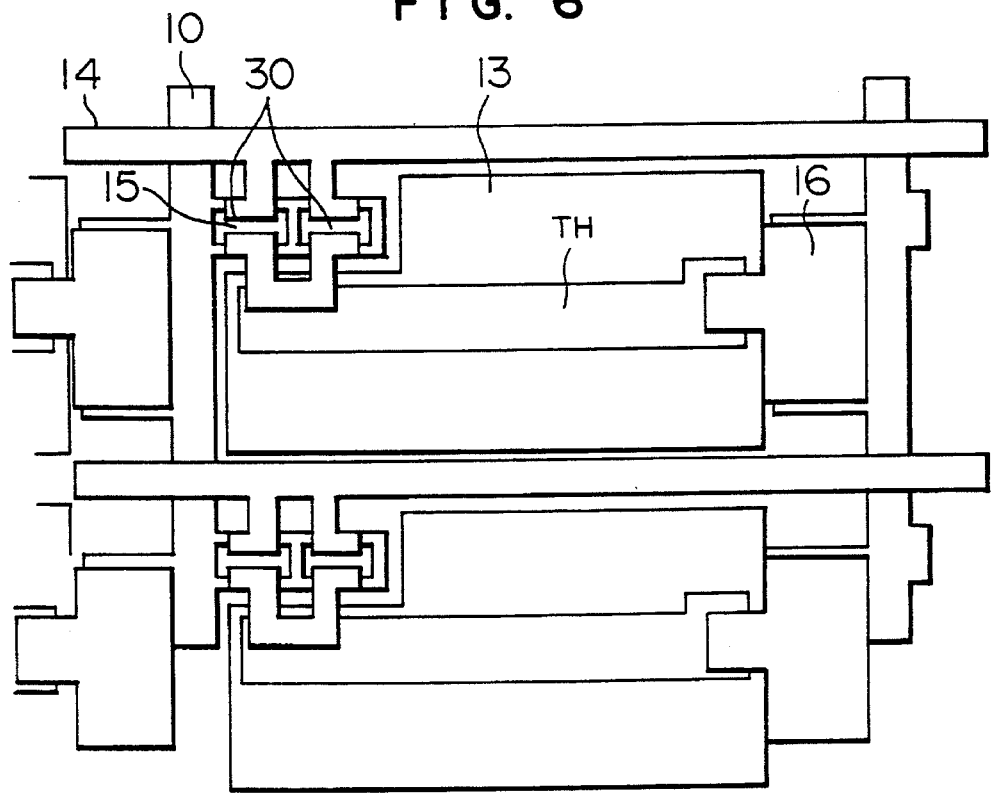
FIG. 6 shows a plan view of a third embodiment of the present invention.

FIG. 6 shows a plan view of a third embodiment of the present invention. A sectional structure of the present embodiment is identical to that of FIG. 2. The present embodiment is characterized in that two TFT's are connected to the first pixel electrodes, the second pixel electrode and the first pixel electrode are connected at a projected area formed in the second pixel electrode, and an aperture TH of the SiN film formed in the first pixel electrode is substantially rectangular with a major side thereof being parallel to the video signal line.

In the present embodiment, since a plurality of TFT's are provided, the redundancy is imparted for any trouble of the TFT. In addition, since the projected area is formed in the second pixel electrode and it may be cut away, the additional capacitor as well as one of the TFT's may be cut away at the projected area formed in the second pixel electrode if a short circuit error occurs in the additional capacitor so that the defect pixel is corrected detail thereof will be explained later. Further, since the aperture TH of the SiN film is substantially rectangular with the major side thereof being parallel to the video signal line, the short circuit between the adjacent video signal lines due to the etching residual of the semiconductor films 30 and 31 is prevented. Namely, if the semiconductor films 30 and 31 partially remain to cross the two adjacent video signal lines because of incorrect photoresist pattern, the short circuit occurs between the video signal lines through the semiconductor films. In accordance with the construction of the present embodiment, since the semiconductor films which are present on the SiN film are etched away when the SiN film is apertured, the semiconductor films which cause the short circuit are separated by the aperture TH and the problem of short circuit is automatically solved. Accordingly, because of the rectangular aperture TH with the major side thereof being parallel to the second wiring, the short circuit between wirings can be prevented wherever in the pixel electrode the residual of the semiconductor film may exist.

Figure 7:
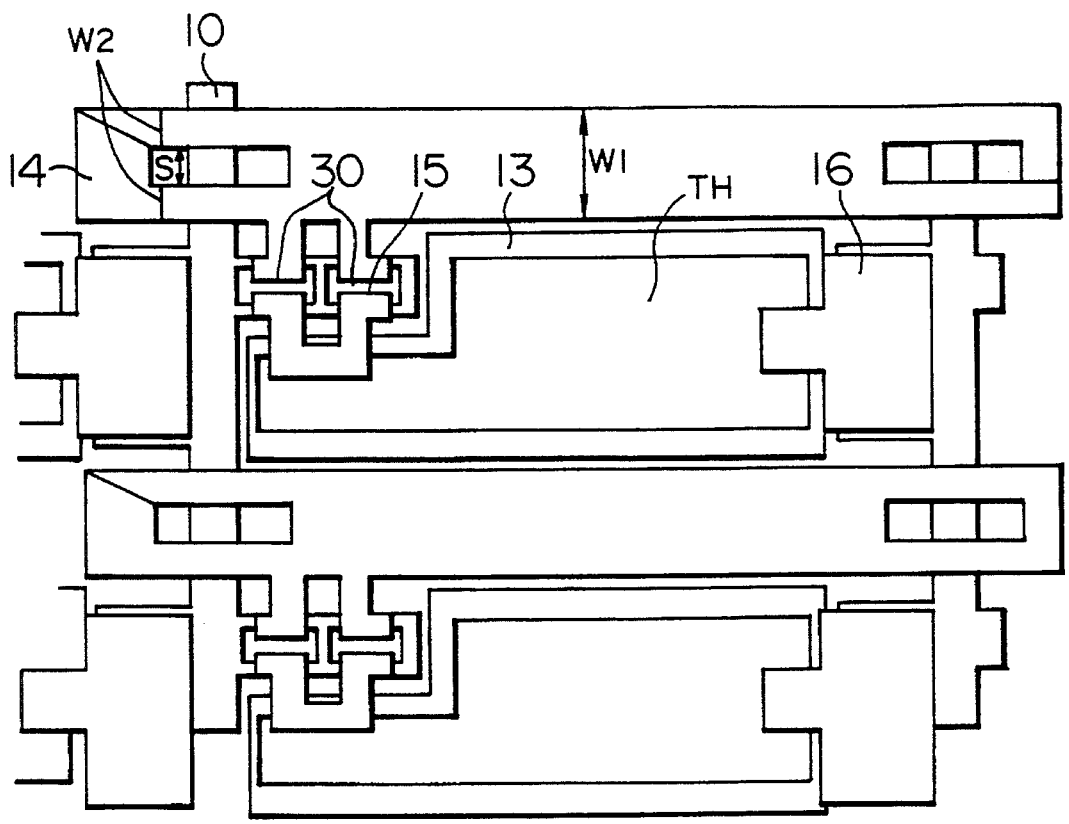
FIG. 7 shows a plan view of a fourth embodiment of the present invention.

FIG. 7 shows a plan view of a fourth embodiment of the present invention. A sectional structure of the present embodiment is identical to that of FIG. 2. In the present embodiment, the video signal line is branched at a cross point of the scan signal line, and a sum of a width W2 of the wiring at the branch and a space S2 between the wirings is equal to a width W1 of the wiring in other area than the branch. Thus, the short circuit between the windings at the cross point can be corrected by cutting away the short-circuit branch wiring by the laser. Since the wiring width W1 in other area than the branch is expanded, the break in the other area can be reduced. In the prior art, when the wiring width is expanded, the width of the pixel electrode must be reduced in order to prevent the short circuit with the pixel electrode and hence the aperture factor is reduced. In the present embodiment, since the video signal lines and the first pixel electrodes are insulated and separated by the SiN film, the distance between the video signal line and the first pixel electrode can be reduced and the wiring width can be expanded without reducing the width of the pixel electrode. Accordingly, in the present embodiment, the break of the wiring can be reduced without lowering the aperture factor.

Figure 8:
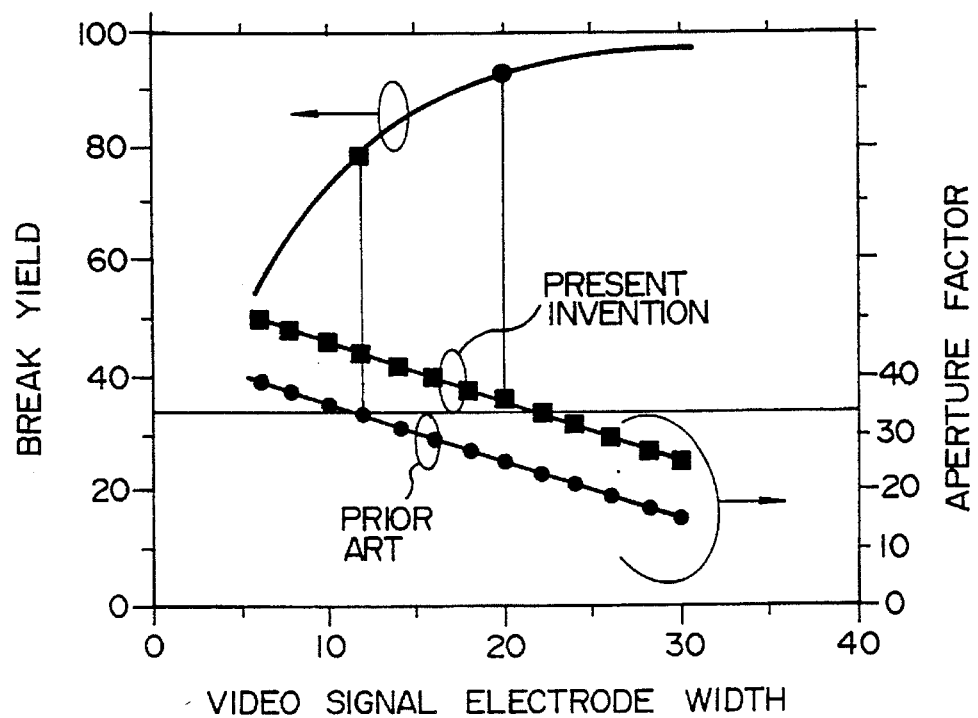
FIG. 8 illustrates an effect of the present invention.

FIG. 8 shows a comparison of relationships between the video signal line width, and a break yield of the video signal line and the aperture factor, in the present invention and the prior art. As the video signal line width increases, the aperture factor reduces and the break yield increases. Namely, the reduction of the aperture factor trades off the break yield. For a given wiring width, the aperture factor in the present invention is approximately a 10% improvement over the prior art. For the aperture factor of 34% (a horizontal line in FIG. 8), the wiring width in the present invention may be approximately 8 μm wider than that of the prior art and hence the break yield is improved approximately 15%. The above effects are due to the reduction of the distance between the video signal line and the pixel electrode. The resulting margin may be applied to the expansion of the pixel electrode width or the expansion of the video signal line width to improve the aperture factor or the break yield, respectively. The effects of the present invention are apparent from the above.

Figure 9:
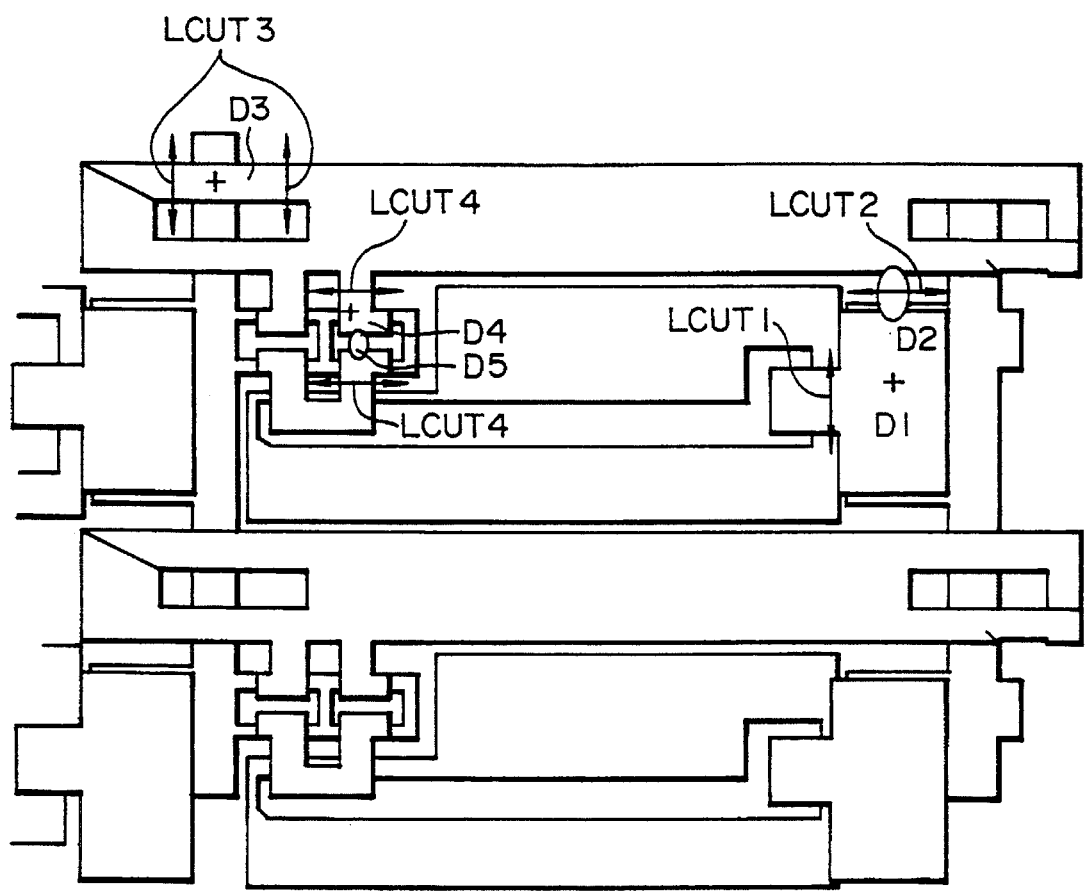
FIG. 9 shows a fifth embodiment of the present invention.

FIG. 9 shows a plan view of a fifth embodiment of the present invention. D1–D5 indicate short circuit defects. LCUT1~LCUT4 indicate the cuttings by the laser. When the short circuit defect (D1) occurs between the scan signal line and the second pixel electrode in the additional capacitor, the area shown by LCUT1 is cut away to separate the second pixel electrode from the first pixel electrode. Under the condition, since there is no additional capacitor for that pixel, a voltage maintenance property is lowered or the variation of the source voltage when a gate pulse rises or falls due to a parasitic capacitance between the gate and the source of the TFT increases, and a normal operation is not attained. Thus, the area shown by LCUT4 is cut away to cut off one TFT in order to reduce the parasitic capacitance between the gate and the source and the off-current of the TFT so that the normal operation is attained at the pixel. When the short circuit defect (D2) occurs between the second pixel electrode and the video signal line in the additional capacitor, the short circuit defect may be corrected by cutting away the area shown by LCUT2. To this end, the construction of the present invention having the increased distance between the second pixel electrode and the video signal line is required. When the short circuit defect (D3) occurs between the scan signal line and the video signal line, two points shown by LCUT3 are cut away to correct the short circuit defect without breaking the line. Finally, when the short circuit defect (D4 or D5) occurs in one of two TFT's, two points shown by LCUT4 are cut away to isolate the TFT to correct the short circuit defect.

In accordance with the construction and method of the present invention, almost all possible short circuit defects can be corrected and the manufacturing yield is materially improved.

A manufacturing process of the first embodiment of the present invention is now explained with reference to FIGS. 10 to 16.

Figure 10:
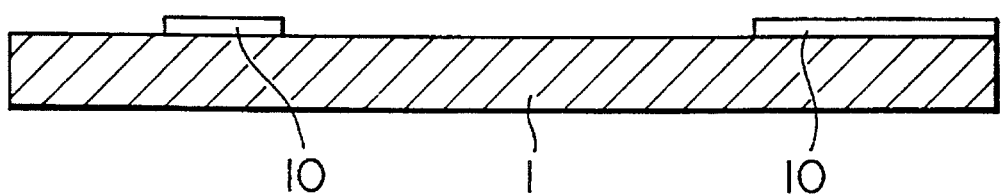
FIG. 10 shows a manufacturing process of a liquid crystal display device of the present invention.

As shown in FIG. 10, an Al film is deposited on a glass substrate to a thickness of 300 nm by a sputtering method and it is patterned into a predetermined pattern by a known photolithography method to form the scan signal lines 10. The material of the scan signal lines 10 is not limited to Al but it may be an alloy film such as Al-Si or Al-Pd, Al-Ta, a Ta-containing metal film such as Ta, Ta-Mo or Ta-W, or a composite film having lamination of those metal films.

Figure 11:
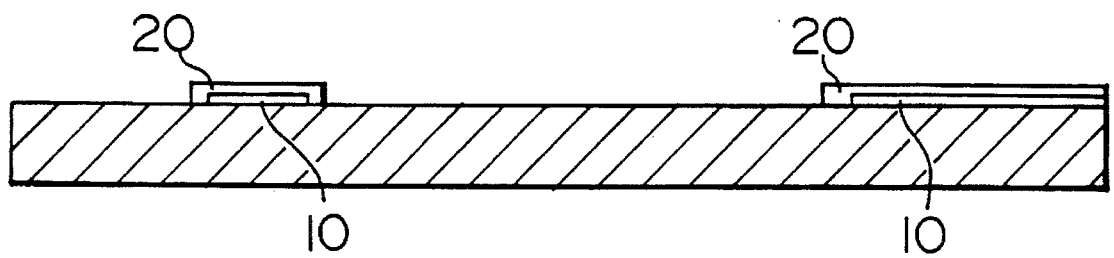
FIG. 11 shows a manufacturing process of a liquid crystal display device of the present invention.

Then, as shown in FIG. 11, the $Al_2O_3$ films 20 are formed on the surfaces and the sides of the scan signal lines 10 by an anodic oxidization method. Where Ta is used for the scan signal lines 10, $Ta_2O_5$ films are formed instead of the $Al_2O_3$ films.

Figure 12:
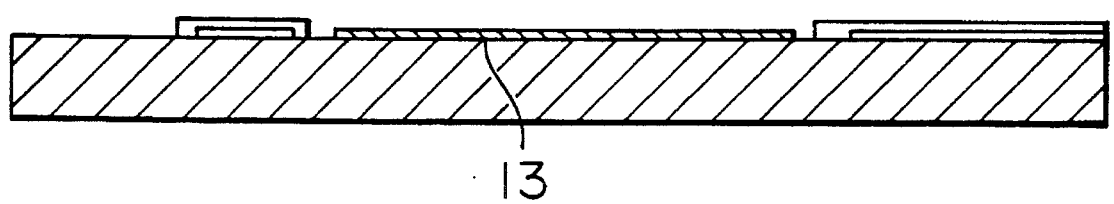
FIG. 12 shows a manufacturing process of a liquid crystal display device of the present invention.

Then, as shown in FIG. 12, the ITO film is deposited to a thickness of 100 nm by the sputtering method, and it is patterned into a predetermined pattern by the known photolithography method to form the first pixel electrodes 13. It is a characteristic of the present embodiment that the first pixel electrodes 13 are formed after the formation of the $Al_2O_3$ film 20. By this process, even if the first pixel electrodes 13 partially remain on the scan signal lines 10 by the patterning error when the first pixel electrodes 13 are formed, the short circuit defect does not occur because they are insulated by the $Al_2O_3$ films 20. If the steps are reversed, a short circuit defect may occur between the electrodes if the patterning is not perfect.

Figure 13:
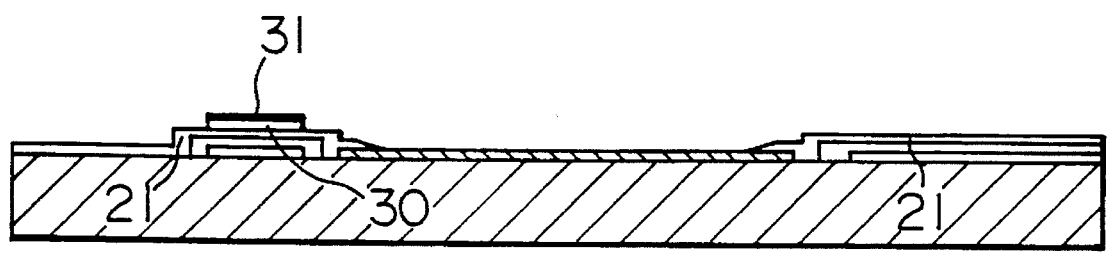
FIG. 13 shows a manufacturing process of a liquid crystal display device of the present invention.
Figure 15:
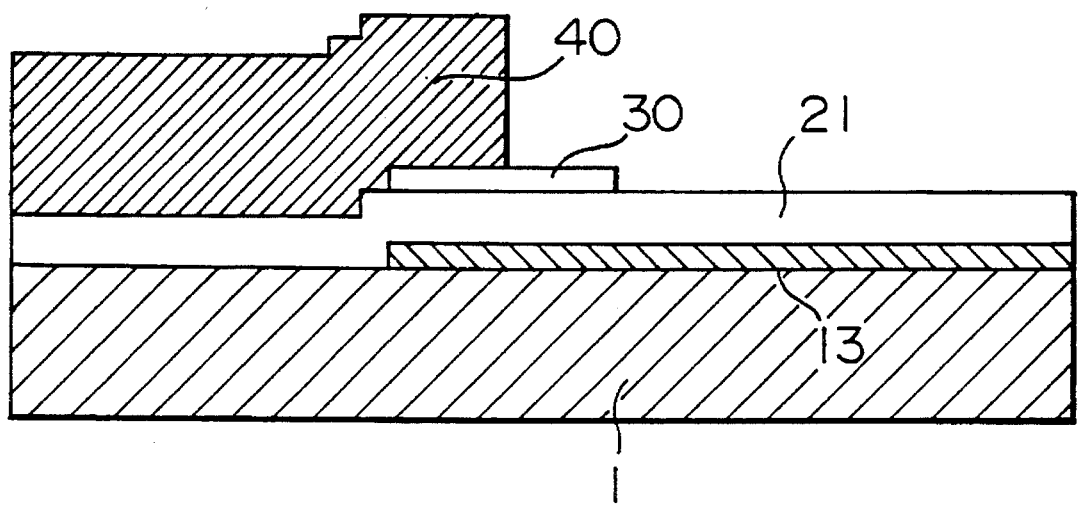
FIG. 15 shows a manufacturing process of a liquid crystal display device of the present invention.
Figure 16:
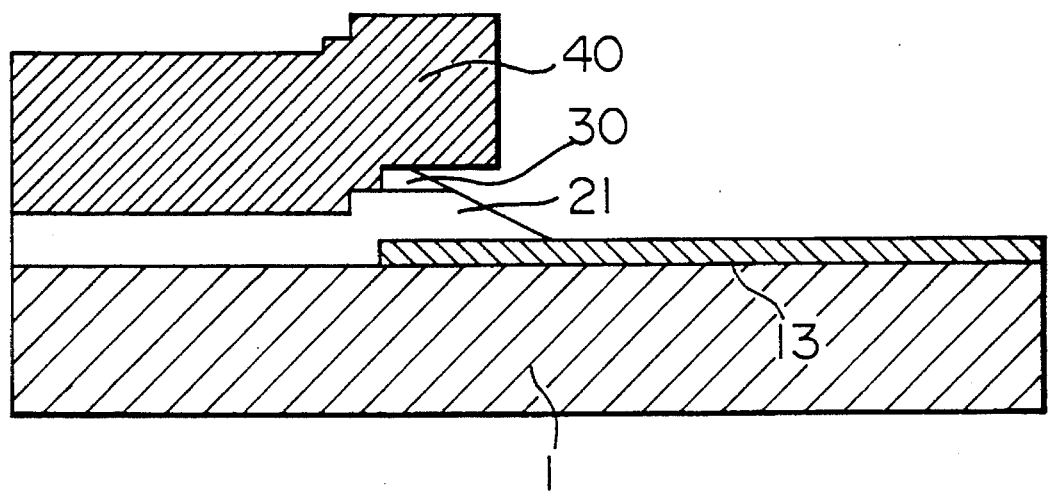
FIG. 16 shows a manufacturing process of a liquid crystal display device of the present invention.

Then, as shown in FIG. 13, the Si-N film 20, the a-Si film 30 and the n-type a-Si film are sequentially formed by a plasma CVD method, and the a-Si film 30 and the n-type a-Si film are patterned into predetermined patterns by the known photo-lithography method. Then, portions of the SiN films 20 on the first pixel electrodes 13 are removed. As shown in FIGS. 15 and 16, the pattern of the a-Si film 30 is left along the edge of the photoresist pattern for the SiN film so that the aperture edges of the SiN film are tapered due to a difference between etching rates of the a-Si film and the SiN film. Where a microwave plasma CVD method which utilizes an electron cyclotron resonance is used to form the SiN film 20, a high quality SiN film may be formed at a formation temperature around a room temperature and it does not appear as whitening on the ITO film and does not lose transparency. Accordingly, a high quality SiN film which may be applied to the gate insulation film of the TFT is formed.

Figure 14:
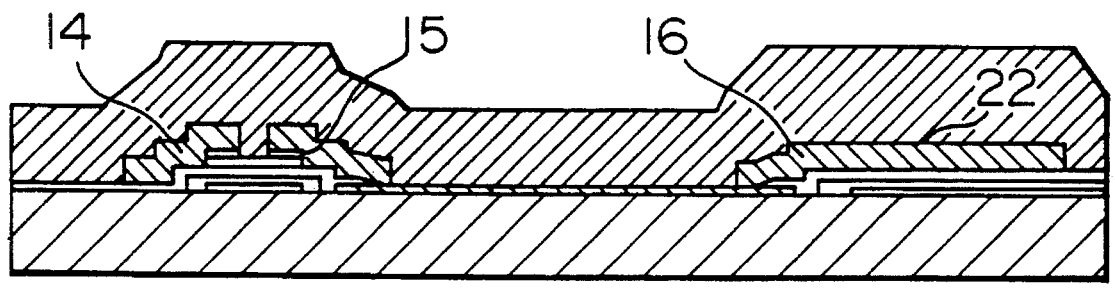
FIG. 14 shows a manufacturing process of a liquid crystal display device of the present invention.

Then, as shown in FIG. 14, the Al-Si film is formed to a thickness of 400 nm by the sputtering method, and it is patterned into a predetermined pattern to form the video signal lines 14, the source electrodes 15 and the second pixel electrodes 16. Then, the source electrodes and the video signal lines are masked and the n-type a-Si films in the channels of the TFT's are etched. Finally, the SiN film is formed to a thickness of 800 nm by the plasma CVD method as a protective layer to complete the thin film semiconductor device.

Figure 17:
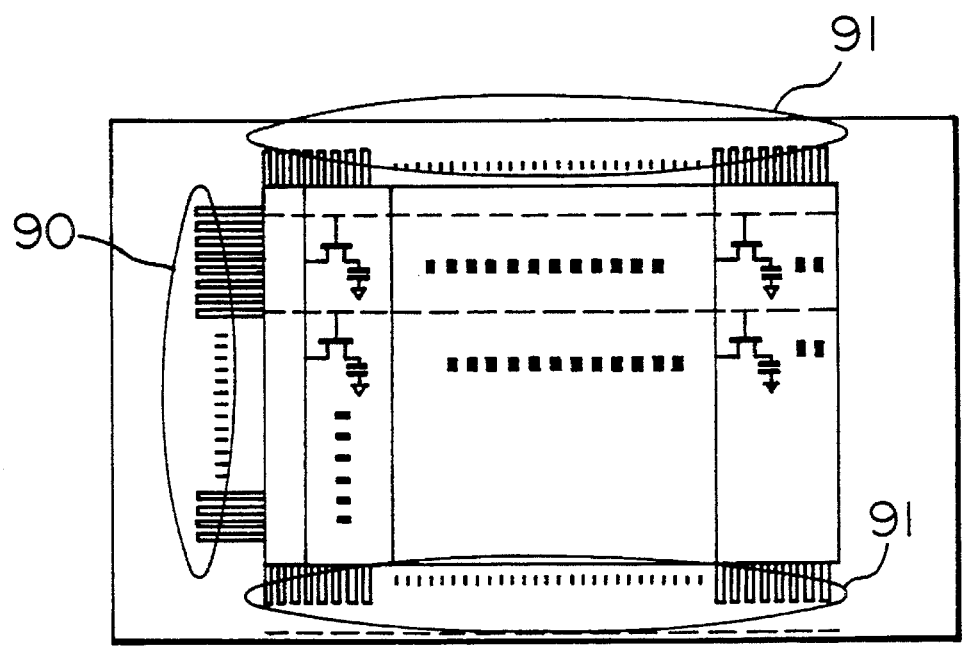
FIG. 17 shows a sixth embodiment of the present invention.
Figure 18:
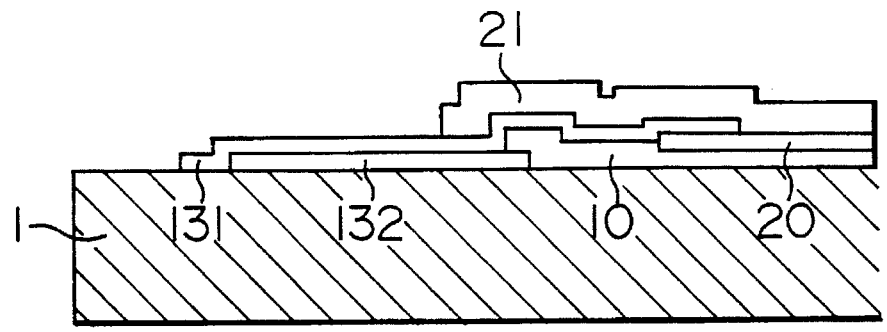
FIG. 18 shows the sixth embodiment of the present invention.
Figure 19:
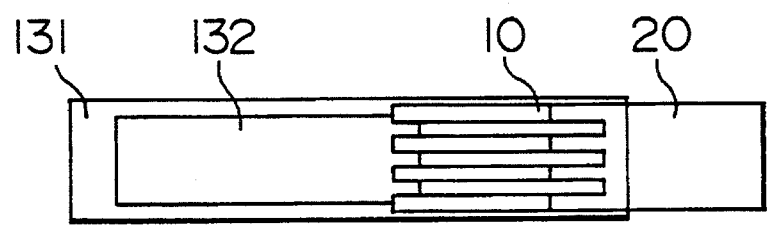
FIG. 19 shows the sixth embodiment of the present invention.

FIGS. 17, 18 and 19 show a seventh embodiment of the present invention.

FIG. 17 shows an overall schematic view of the thin film semiconductor device of the present invention. A TFT active matrix unit 92 has pixels of the structure shown in FIGS. 1~7 arranged in an array. Connecting terminals 90 on the side of the scan signal lines are connected to the scan signal lines 10 of the TFT active matrix unit and serve as terminals to supply signals to the gates of the TFT's. Terminals 91 on the side of the video signal lines are connected to the video signal lines 14. They serve to supply signals from the video signal lines 14 to the pixel electrodes.

FIGS. 18 and 19 show a sectional view and a plan view, respectively, of one of the terminals 90 on the side of the scan signal lines.

Figure 20:
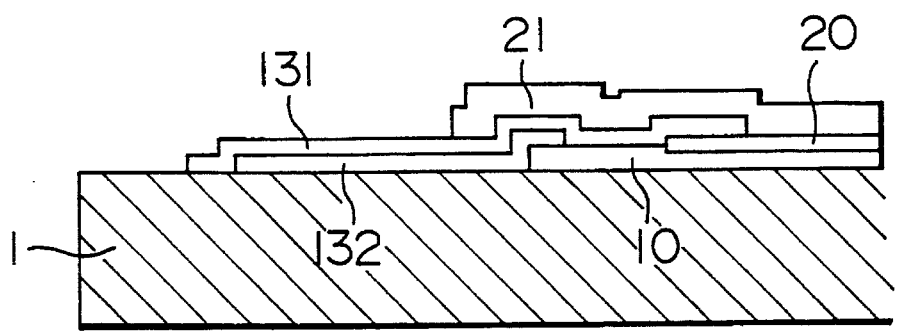
FIG. 20 shows the sixth embodiment of the present invention.

At the scan signal line terminal 90, the scan signal line 10 is connected to a lead terminal 132 made of Cr or Ta, and a terminal protective film 131 made of ITO is formed to cover the lead terminal 132. It is a characteristic of the present embodiment that the terminal protective film 131 extends over the $Al_2 O_3$ film which covers the scan signal line 10, and the width of the terminal protective film 131 is wider than that of the scan signal line 10. By protecting the scan signal line 10 which is not covered by the $Al_2O_3$ film, by the ITO film, the scan signal line 10 is protected from being exposed to the etchant for the ITO film when the ITO film is patterned so that the scan signal line 10 is not eroded by the etchant for the ITO film and a highly reliable connecting terminal is formed. As shown in FIG. 20, the lead terminal 132 may be formed above the scan signal line 10.

Figure 21:
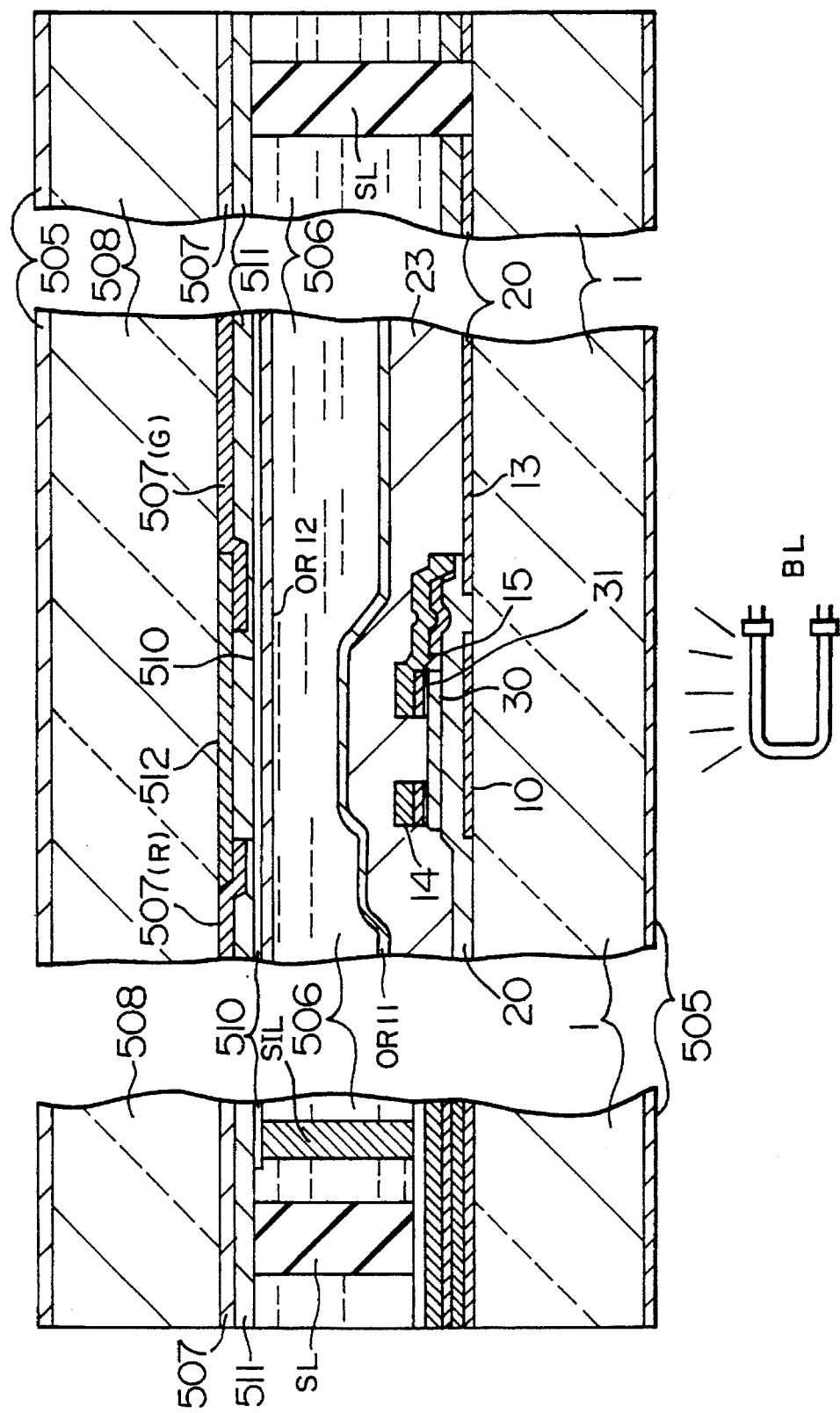
FIG. 21 shows a sectional view of a liquid crystal display device which uses the thin film semiconductor device of the present invention.

A sectional view of a liquid crystal display device constructed by using the thin film semiconductor device of the present invention is shown in FIG. 21.

The scan signal lines 10 and the video signal lines 14 are arranged in matrix on the glass substrate 1 under a liquid crystal layer 506, and TFT's 502 are formed in the vicinity of the crosspoints to drive the first pixel electrodes 13 made of ITO. A counter-electrode 510 made of ITO, a color filter 507, a color filter protective film 511 and a light shielding film 512 for forming a light shielding black matrix pattern are formed on a glass counter-substrate which faces the liquid crystal layer 506. A center portion of FIG. 21 shows a sectional view of one pixel area, a left portion shows a sectional view of a left end portion of the pair of glass substrates 1 and 508 in which the lead terminal exists, and a right portion shows a sectional view of a right end portion of the pair of glass substrates 1 and 508 in which the lead terminal does not exist. A sealing member SL shown in the left and right portions of FIG. 21 serves to seal the liquid crystal layer 506 and it is formed along the entire edges of the glass substrates 1 and 508 except a liquid crystal filling port (not shown). The sealing material is made of epoxy resin. The counterelectrode 510 facing the glass counter-substrate 508 is connected, at at least one point thereof, to the lead wiring formed on the glass substrate 1 by silver paste material SIL. The lead wiring is formed in the same manufacturing process as that of the scan signal lines 10, the source electrodes 15 and the video signal lines 14. Orientation films ORI1 and ORI2, the pixel electrodes 13, the protective film 23, the color filter protective film 511 and the gate SiN film 21 are formed on an inner side of the sealing material SL. Polarization plates 505 are formed on outer surfaces of the pair of glass substrates 1 and 508.

The liquid crystal layer 506 is filled between the lower orientation film ORI1 and the upper orientation film ORI2 which orient the liquid crystal molecules and sealed by the sealing material SL. The lower orientation film ORI1 is formed on the protective film 23 facing the glass substrate 1. The light shielding film 512, the color filter 507, the color filter protective film 511, the counter-electrode 510 and the upper orientation film ORI2 are sequentially formed on the inner surface of the glass counter-substrate 508. The liquid crystal display device is assembled by separately forming sub-assemblies on the glass substrate 1 and the glass counter-substrate 508, assembling the upper and lower glass substrates 1 and 508 together and filling the liquid crystal 506 therebetween. A TFT-driven color liquid crystal display device is provided by controlling the transmission of the light from a back light BL at the areas of the pixel electrodes 13.

Figure 22:
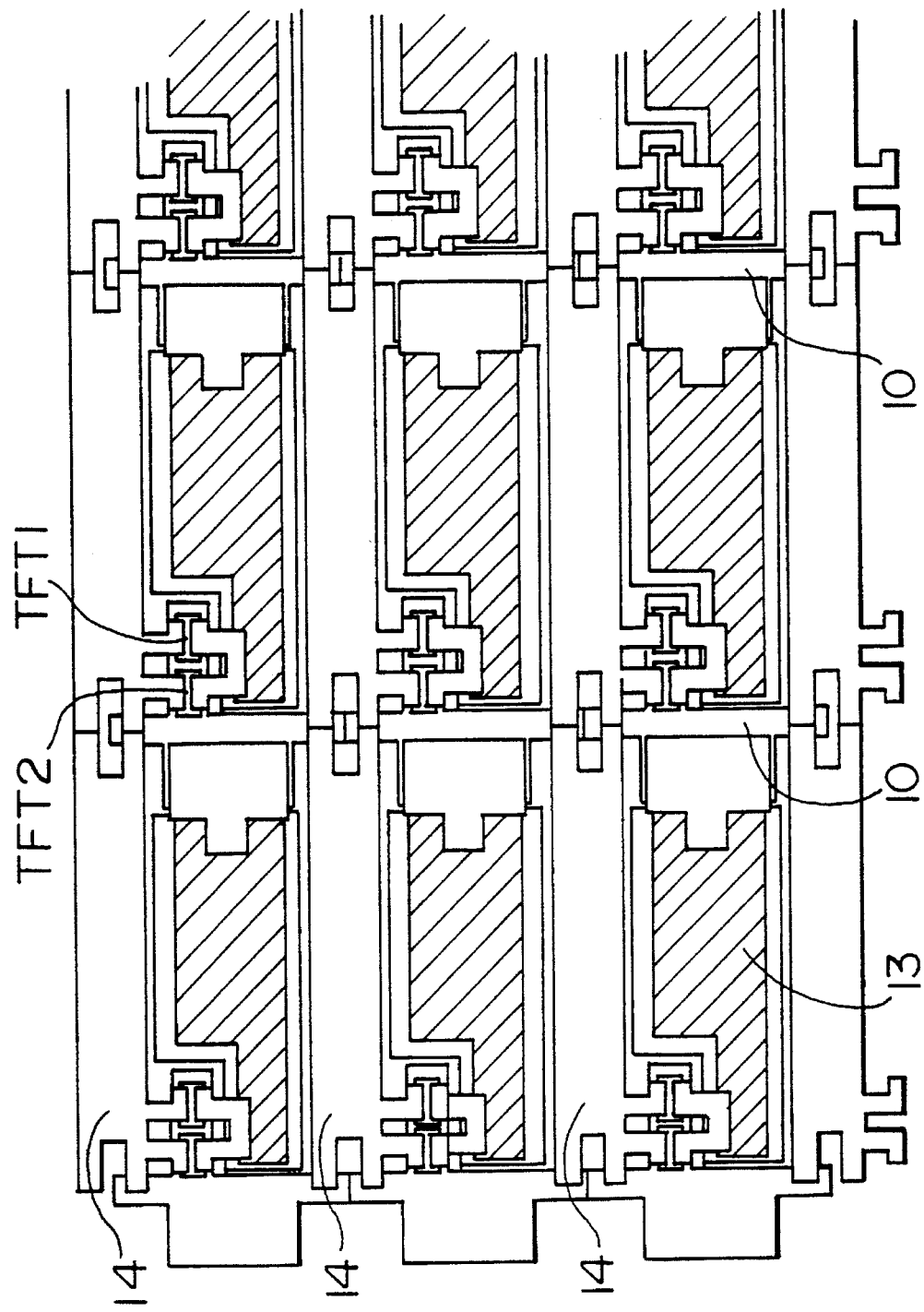
FIG. 22 shows a plan view of an arrangement of a plurality of unit pixels shown in the fourth embodiment of the present invention.

FIG. 22 shows a plan view of a pixel array on the glass substrate. Pixels are arranged in columns along the scan signal electrodes 10 to form pixel columns X1, X2, X3, . . . . Pixels of the pixel columns X1, X2, X3, . . . have the same arrangement of transistors TFT1 and TFT2 and the pixel electrode 13. The video signal electrodes 14 are arranged to cross the scan signal electrodes 10 and each video signal electrode is connected to one pixel in each pixel column.

Figure 23:
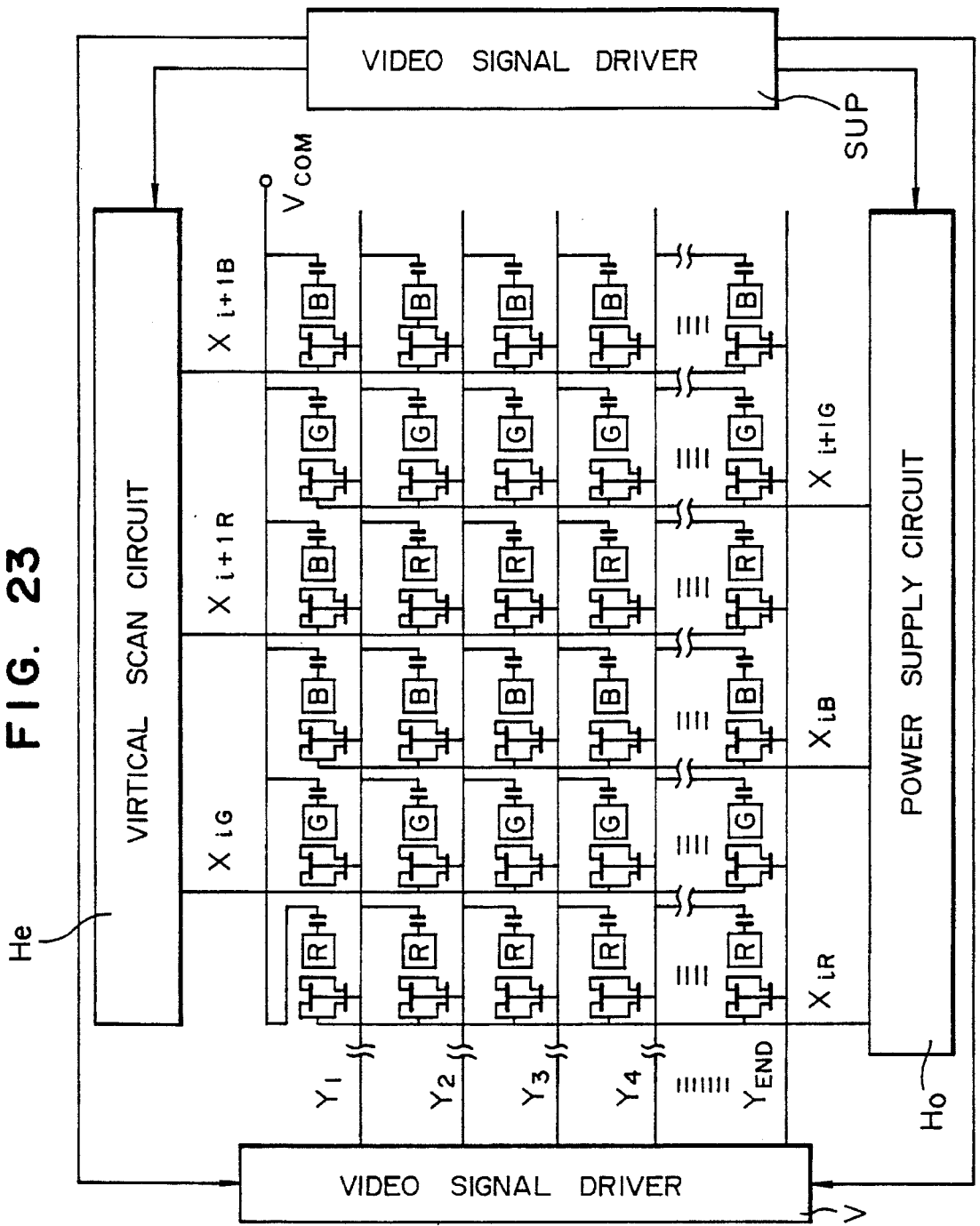
FIG. 23 shows an equivalent circuit diagram of an overall liquid crystal display device which uses the thin film semiconductor device of the present invention.

FIG. 23 shows an equivalent circuit of the overall display device. $X_iG$, $X_{i+1}G$, . . . denote video signal lines connected to the pixels at which green filters G are formed. Similarly, $X_iB$, $X_{i+1}B$, . . . denote video signal lines connected to the pixels at which blue filters are formed, and $X_iR$, $X_{i+1}R$, . . . denote video signal lines connected to pixels at which red filters are formed. $Y_i$, $Y_{i+1}$, . . . denote the scan signal lines 10 for selecting the pixel columns X1, X2, . . . shown in FIG. 20. Those scan signal lines 10 are connected to a vertical scan circuit V. The video signal lines are connected alternately to an upper video signal driver He and a lower video signal driver Ho.

SUP includes a power supply circuit for producing a plurality of stabilized and divided voltage sources from one voltage source and a circuit for converting information for a CRT from a host (host processor) to information for a liquid crystal display panel.

In accordance with the present invention, since the highly reliable additional capacitor is provided while the pixel electrodes and the adjacent wiring electrodes are separated by the insulation films, the thin film semiconductor device with less short circuit defect is provided. Further, the thin film semiconductor device with less short circuit defect without lowering the aperture factor and which permits the correction of the short circuit defect is provided. In addition, since the thin film semiconductor device which can correct all possible short circuit defects is provided, a substantially defect-free display device is attained by constructing the image display device by using the thin film semiconductor device of the present invention, and a high manufacturing yield is attained.

What is claimed is:

1. An active matrix type liquid crystal display device comprising:

a pair of substrates;

a liquid crystal layer held between said pair of substrates; wherein one substrate of said pair of substrates has formed thereon:

a plurality of parallel scanning gate electrodes;

a first insulator film covering surfaces and sides of said scanning gate electrodes;

a plurality of first pixel electrodes made of transparent conductors arranged in the same plane as, and between, said scanning gate electrodes;

a second insulator film formed on at least a portion of said scanning gate electrodes and said first pixel electrodes;

a plurality of video signal electrodes formed substantially perpendicularly to said scanning gate electrodes on said second insulator film;

second pixel electrodes having first ends thereof formed on top of and being electrically connected to said first pixel electrodes, said second pixel electrodes at least partially overlapping said scanning gate electrodes and being electrically isolated from said scanning gate electrodes by said first insulator film and said second insulator film, so that an additional capacitor is formed therebetween; and a plurality of transistors electrically connected to said scanning gate electrodes, said first pixel electrodes and said video signal electrodes.

2. A liquid crystal display device according to claim 1, wherein said first insulator film is a self-aligning oxidation layer of said scanning gate electrodes.

3. A liquid crystal display device according to claim 1, wherein said first pixel electrodes and said video signal electrodes are electrically insulated and separated from each other by insulator layers.

4. A liquid crystal display device as claimed in claim 1, wherein said scanning gate electrodes are formed of a metal, and said first insulator film is a self-oxidization film of said metal.

5. An active matrix type liquid crystal display device comprising:

a first substrate and a second substrate having electrodes thereon; and a liquid crystal layer held between said first substrate and said second substrate;

one of said first substrate and said second substrate including:

a plurality of parallel scanning gate electrodes having a predetermined spacing therebetween;

a plurality of common electrodes formed substantially parallel to, and between, said scanning gate electrodes;

a plurality of first pixel electrodes made of transparent conductors arranged in the same plane as, and between, alternating said scanning gate electrodes and said common electrodes, said first pixel electrodes being separated from said scanning gate electrodes and said common electrodes by predetermined distances;

an insulator layer formed on said common electrodes, and between said common electrodes and said first pixel electrodes;

second pixel electrodes each having different portions thereof electrically connected to two adjacent said first pixel electrodes, said second pixel electrodes at least partially overlapping said common electrodes and being electrically isolated from said common electrodes by said insulator layer, wherein an arrangement of overlapping portions of said second pixel electrodes and said common electrodes separated by said insulator layer comprises a plurality of capacitors.

6. A liquid crystal display device according to claim 5, further comprising a plurality of video signal electrodes formed substantially perpendicularly to said scanning gate electrodes on said insulator layer, wherein said first pixel electrodes and said video signal electrodes are electrically insulated and separated from each other.

7. A liquid crystal display device according to claim 5, wherein said insulator layer is made of two different types of insulators.

8. An active matrix type liquid crystal display device as claimed in claim 5, wherein said insulator layer comprises a first insulator film formed selectively on said common electrodes, and a second insulator film formed on said first insulator film and between said common electrodes and said first pixel electrodes, whereby said first pixel electrodes and said second pixel electrodes are electrically isolated from said common electrodes by said first insulator film and said second insulator film.

9. An active matrix type liquid crystal display device as claimed in claim 8, wherein said insulator layer is additionally formed on said scanning gate electrodes, and said insulator layer further comprises said first insulator film formed selectively on said scanning gate electrodes, and said second insulator film formed on said first insulator film and between said scanning gate electrodes and said first pixel electrodes, whereby said first pixel electrodes are electrically isolated from said scanning gate electrodes by said first insulator film and said second insulator film.

10. An active matrix type liquid crystal display device as claimed in claim 9, wherein said first insulator film is a self-aligning oxidation layer of said scanning gate electrodes.

11. An active matrix type liquid crystal display device as claimed in claim 8, wherein said first insulator film is a self-aligning oxidation layer of said scanning gate electrodes.

12. A liquid crystal display device as claimed in claim 8, wherein said scanning gate electrodes are formed of a metal, and said first insulator film is at least partially formed of a self-oxidization film of said metal.

13. A method of manufacturing a liquid crystal display device comprising the steps of:

forming scanning gate electrodes on a transparent insulator substrate;

forming a first insulator film on said scanning gate electrodes;

forming, after formation of said first insulator film, first pixel electrodes made of transparent conductors in the same plane as, and between, said scanning gate electrodes;

forming a second insulator film on at least a portion of said scanning gate electrodes and said first pixel electrodes;

forming semiconductor films of predetermined patterns on said second insulator film; and forming video signal electrodes on said second insulator film, source electrodes for connecting said semiconductor films and said first pixel electrodes, and second pixel electrodes at least partially formed on top of and electrically connected to said first pixel electrodes.

14. A method of manufacturing a liquid crystal display device according to claim 13, wherein said first insulator film is a self-aligning oxidation layer of said scanning gate electrodes.

15. A method of manufacturing a liquid crystal display device according to claim 13, further comprising a step of electrically isolating a defective portion of said liquid crystal display device using a focused beam such as a laser beam to interrupt an electrical conduction path between said defective portion and remaining portions of said liquid crystal display device.

16. A liquid crystal display device as claimed in claim 13, wherein said scanning gate electrodes are formed of a metal, and said first insulator film is a self-oxidization film of said metal.

17. A method of manufacturing a liquid crystal display device comprising the steps of:

forming scanning gate electrodes and common electrodes on an insulative substrate;

forming a first insulator film on said scanning gate electrodes and said common electrodes:

forming, after formation of said first insulator film, first pixel electrodes made of transparent conductors in the same plane as said scanning gate electrodes and said common electrodes;

forming a second insulator film on at least a portion of said scanning gate electrodes, said common electrodes and said first pixel electrodes;

forming semiconductor films of predetermined patterns on said second insulator film;

forming video signal electrodes on said second insulator film, source electrodes for connecting said semiconductor films and said first pixel electrodes, and second pixel electrodes at least partially formed on top of and electrically connected to said first pixel electrodes.

18. A method of manufacturing a liquid crystal display device according to claim 17 wherein said first insulator film is a self-aligning oxidation layer of said scanning gate electrodes and said common electrodes.

19. A method of manufacturing a liquid crystal display device according to claim 17, further comprising a step of electrically isolating a defective portion of said liquid crystal display device using a focused beam such as a laser beam to interrupt an electrical conduction path between said defective portion and remaining portions of said liquid crystal display device.

20. A liquid crystal display device as claimed in claim 17, wherein said scanning gate electrodes are formed of a metal, and said first insulator film is at least partially formed of a self-oxidization film of said metal.

21. A method of manufacturing an active matrix type liquid crystal display device comprising the steps of:

forming a plurality of parallel scanning gate electrodes;

forming a first insulator film selectively on said scanning gate electrodes;

forming, after formation of said first insulator film, a plurality of first pixel electrodes made of transparent conductors arranged in the same plane as, and between, said scanning gate electrodes;

forming a second insulator film formed on at least a portion of said scanning gate electrodes and said first pixel electrodes;

forming a plurality of video signal electrodes substantially perpendicularly to said scanning gate electrodes on said second insulator film;

forming second pixel electrodes having first ends on top of and electrically connected to said first pixel electrodes, said second pixel electrodes at least partially overlapping said scanning gate electrodes and being electrically isolated from said scanning gate electrodes by said first insulator film and said second insulator film, wherein an arrangement of overlapping portions of said second pixel electrodes and said scanning gate electrodes separated by said first insulator film and said second insulator film comprising a plurality of capacitors; and forming a plurality of transistors electrically connected to said scanning gate electrodes, said first pixel electrodes and said video signal electrodes.

22. A liquid crystal display device according to claim 21, wherein said first insulator film is formed by a self-aligning oxidation layer of said scanning gate electrodes.

23. A liquid crystal display device as claimed in claim 21, wherein said scanning gate electrodes are formed of a metal, and said first insulator film is a self-oxidization film of said metal.

24. A method of manufacturing an active matrix type liquid crystal display device comprising the steps of:

forming a plurality of parallel scanning gate electrodes having a predetermined spacing therebetween;

forming a plurality of common electrodes substantially parallel to, and between, said scanning gate electrodes;

forming a plurality of first pixel electrodes made of transparent conductors arranged in the same plane as, and between, alternating said scanning gate electrodes and said common electrodes, said first pixel electrodes being separated from said scanning gate electrodes and said common electrodes by predetermined distances;

forming an insulator layer on said common electrodes, and between said common electrodes and said first pixel electrodes;

forming second pixel electrodes each having different portions thereof electrically connected to two adjacent said first pixel electrodes, said second pixel electrodes at least partially overlapping said common electrodes and being electrically isolated from said common electrodes by said insulator layer, wherein an arrangement of overlapping portions of said second pixel electrodes and said common electrodes separated by said insulator layer comprises a plurality of capacitors.

25. A method as claimed in claim 24, wherein said insulator layer is made of two different types of insulators.

26. A method as claimed in claim 24, further comprising a step of forming a plurality of video signal source electrodes substantially perpendicularly to said scanning gate electrodes on said insulator layer, wherein said first pixel electrodes and said video signal source electrodes are electrically insulated and separated from each other.

27. A method as claimed in claim 24, wherein said insulator layer is formed by the steps of forming a first insulator film selectively on said common electrodes, and forming a second insulator film on said first insulator film and between said common electrodes and said first pixel electrodes, whereby said first pixel electrodes and said second pixel electrodes are electrically isolated from said common electrodes by said first insulator film and said second insulator film.

28. A method as claimed in claim 27, wherein said first insulator film is formed using a self-aligning oxidation layer of said scanning gate electrodes.

29. A method as claimed in claim 27, wherein said insulator layer is additionally formed on said scanning gate electrodes, and said insulator layer is further formed by the steps of forming said first insulator film selectively on said scanning gate electrodes, and forming said second insulator film on said first insulator film and between said scanning gate electrodes and said first pixel electrodes, whereby said first pixel electrodes are electrically isolated from said scanning gate electrodes by said first insulator film and said second insulator film.

30. A method as claimed in claim 29, wherein said first insulator film is formed using a self-aligning oxidation layer of said scanning gate electrodes.

31. A liquid crystal display device as claimed in claim 29, wherein said scanning gate electrodes are formed of a metal, and said first insulator film is at least partially formed of a self-oxidization film of said metal.

* * * * *